US012570780B2

(12) United States Patent
Sawa et al.

(10) Patent No.: US 12,570,780 B2
(45) Date of Patent: Mar. 10, 2026

(54) MODIFIED POLYVINYL ALCOHOL RESIN WITH IMPROVED SOLUBILITY IN ALCOHOL MIXTURES

(71) Applicant: Sekisui Specialty Chemicals America, LLC, Dallas, TX (US)

(72) Inventors: Kazuhiro Sawa, Pasadena, TX (US); Richard Vicari, Pasadena, TX (US)

(73) Assignee: Sekisui Specialty Chemicals America, LLC, Dallas, TX (US)

( * ) Notice: Subject to any disclaimer, the term of this patent is extended or adjusted under 35 U.S.C. 154(b) by 545 days.

(21) Appl. No.: 18/154,654

(22) Filed: Jan. 13, 2023

(65) Prior Publication Data

US 2023/0227595 A1 Jul. 20, 2023

Related U.S. Application Data

(60) Provisional application No. 63/266,796, filed on Jan. 14, 2022.

(51) Int. Cl.
*C08F 216/06* (2006.01)
*C08F 118/08* (2006.01)
(Continued)

(52) U.S. Cl.
CPC ............ *C08F 216/06* (2013.01); *C09D 5/022* (2013.01); *C09D 11/023* (2013.01);
(Continued)

(58) Field of Classification Search
CPC .... C08F 216/06; C08F 118/08; C08F 218/08; C08F 228/00; C09D 129/04
See application file for complete search history.

(56) References Cited

U.S. PATENT DOCUMENTS 5,543,446 A 8/1996 Rodriguez
6,787,512 B1 9/2004 Verrall et al.
(Continued)

FOREIGN PATENT DOCUMENTS

JP S56139510 A 10/1981
JP 6484374 B1 3/2019
(Continued)

OTHER PUBLICATIONS

International Search Report issued in Application No. PCT/US2023/010810, mailed on May 16, 2023 (3 pages).
(Continued)

*Primary Examiner* — Kregg T Brooks
*Assistant Examiner* — David R. Foss
(74) *Attorney, Agent, or Firm* — Osha Bergman Watanabe & Burton LLP

(57) ABSTRACT

A sulfonic acid modified polyvinyl alcohol resin comprising up to 15 mol % of a first comonomer comprising sulfonic acid groups. The modified polyvinyl alcohol resin has a hydroxyl unit content of at least 65 mol % and a gel fraction of 3.2 or less. Further, the modified polyvinyl alcohol resin has a disintegration time of 85 seconds or less, as measured in a mixture of 50 vol % water and 50 vol % isopropyl alcohol at 23° C. Additionally, the modified polyvinyl alcohol resin has a hard component present in a component ratio of 10% or greater and 55% or less and having a relaxation time of 0.0091 milliseconds or greater and 0.0104 milliseconds or less, as measured by the pulsed NMR Solid Echo method at 80° C. Also disclosed are methods for producing the sulfonic acid modified polyvinyl alcohol resins, which may advantageously be used in inks, paints, paper coatings, emulsions, or films.

20 Claims, 6 Drawing Sheets

(51) Int. Cl.

| | |
|---|---|
| ***C08F 218/08*** | (2006.01) |
| ***C08F 228/00*** | (2006.01) |
| ***C09D 5/02*** | (2006.01) |
| ***C09D 11/023*** | (2014.01) |
| ***C09D 11/106*** | (2014.01) |
| ***C09D 129/04*** | (2006.01) |

(52) U.S. Cl.

CPC .......... *C09D 11/106* (2013.01); *C09D 129/04* (2013.01); *C08F 118/08* (2013.01); *C08F 218/08* (2013.01); *C08F 228/00* (2013.01); *C08F 2800/10* (2013.01)

(56) References Cited

U.S. PATENT DOCUMENTS

| | | | |
|---|---|---|---|
| 6,818,709 | B1 | 11/2004 | Vicari |
| 7,745,517 | B2 | 6/2010 | Vicari et al. |
| 7,786,229 | B2 | 8/2010 | Vicari |
| 7,932,328 | B2 | 4/2011 | Vicari |
| 8,466,243 | B2 | 6/2013 | Vicari |
| 8,728,593 | B2 | 5/2014 | Vicari et al. |
| 8,772,220 | B2 | 7/2014 | Vicari et al. |
| 10,144,810 | B2 | 12/2018 | Carrier et al. |
| 10,240,114 | B2 | 3/2019 | Labeque et al. |
| 10,351,685 | B2 | 7/2019 | Ieda et al. |
| 10,654,958 | B2 | 5/2020 | Mori et al. |
| 2005/0042443 | A1 | 2/2005 | Miller |
| 2021/0009772 | A1 | 1/2021 | Nishimura et al. |
| 2021/0032421 | A1 | 2/2021 | Nishimura et al. |
| 2021/0041613 | A1 | 2/2021 | Nishimura et al. |

FOREIGN PATENT DOCUMENTS

| | | | | | |
|---|---|---|---|---|---|
| JP | 2019184992 | A | | 10/2019 | |
| JP | 2021143295 | A | | 9/2021 | |
| JP | 2021143296 | A | | 9/2021 | |
| JP | 2021143297 | A | | 9/2021 | |
| WO | 2015020046 | A1 | | 2/2015 | |
| WO | 2016061025 | A1 | | 4/2016 | |
| WO | 2016112103 | A1 | | 7/2016 | |
| WO | 2016160664 | A1 | | 10/2016 | |
| WO | 2019020156 | A1 | | 1/2019 | |
| WO | 2019151206 | A1 | | 8/2019 | |
| WO | WO-2019189695 | A1 | * | 10/2019 | ............... G02B 1/04 |
| WO | 2020138341 | A1 | | 7/2020 | |
| WO | 2020138437 | A1 | | 7/2020 | |
| WO | 2020138438 | A1 | | 7/2020 | |
| WO | WO-2021067476 | A1 | * | 4/2021 | ......... D04H 1/43835 |

OTHER PUBLICATIONS

Written Opinion issued in Application No. PCT/US2023/010810, mailed on May 16, 2023 (6 pages).

Geethanjali et al.; "Synthesis of Water Soluble Polyvinyl Alcohol-Based Terpolymer and Evaluation of Corrosion Inhibition Property on Mild Steel in Hydrochloric Acid;" Reseach Journal of Recent Sciences; vol. 3; Mar. 17, 2014; pp. 170-176 (7 pages).

Okaya et al.; "Modification of Polyvinyl Alcohol by Copolmerization;" Polyvinyl Alcohol Properties and Applications; 1973; pp. 84-93 (5 pages).

Office Action issued in European Application No. 23707828.2, mailed on Aug. 22, 2024 (3 Pages).

* cited by examiner

FIG. 5A (Table 2A) – Terpolymers

| Modified PVOH | Sample # | Initial charge, phr | | | | Delay feed, phr | | | Initiator, phr | | | Saponification |
|---|---|---|---|---|---|---|---|---|---|---|---|---|
| | | VAM | AMPS | 2nd comonomer | MeOH | AMPS | 2nd comonomer | MeOH | Trig23 | TrigEHP | MeOH | NaOH/PVAc (mole%) |
| VAM-AMPS-NVP Terpolymer | N1 | 1332 | 19.3 | 4.3 | 385 | 358 | 14.0 | | 1.54 | | 76.7 | 0.02 |
| | N2 | 1248 | 18.2 | 11.5 | 385 | 343 | 41.1 | | 1.48 | | 133.7 | 0.02 |
| | N3 | 1351 | 11.2 | 4.4 | 385 | 214 | 13.8 | | 1.33 | | 133.7 | 0.02 |
| | N4 | 1366 | 11.4 | 11.5 | 385 | 221 | 44.8 | | 1.54 | | 76.7 | 0.02 |
| | N5 | 1323 | 15 | 7.4 | 385 | 285 | 29.0 | | 1.43 | | 105.7 | 0.02 |
| | N6 | 1315 | 11 | 11.2 | 385 | 213 | 43.1 | | 1.48 | | 133.7 | 0.02 |
| | N7 | 1296 | 18.8 | 12 | 385 | 356 | 42.6 | | 1.54 | | 76.7 | 0.02 |
| | N8 | 1332 | 19.3 | 4.4 | 385 | 358 | 13.9 | | 1.38 | | 76.7 | 0.02 |
| | N9 | 1323 | 15 | 7.4 | 385 | 285 | 29.0 | | 1.43 | | 105.7 | 0.02 |
| | N10 | 1282 | 18.5 | 4.2 | 385 | 345 | 13.4 | | 1.33 | | 133.7 | 0.02 |
| | N11 | 1282 | 18.5 | 4.2 | 385 | 345 | 13.4 | | 1.48 | | 133.7 | 0.02 |
| | N12 | 1366 | 11.4 | 11.5 | 385 | 221 | 44.8 | | 1.38 | | 76.7 | 0.02 |
| | N13 | 1296 | 18.8 | 12 | 385 | 356 | 42.6 | | 1.38 | | 76.7 | 0.02 |
| | N14 | 1248 | 18.2 | 11.5 | 385 | 343 | 41.1 | | 1.33 | | 133.7 | 0.02 |
| | N15 | 1351 | 11.2 | 4.4 | 385 | 213 | 13.8 | | 1.48 | | 133.7 | 0.02 |
| | N16 | 1403 | 11.7 | 4.6 | 385 | 222 | 14.3 | | 1.38 | | 76.7 | 0.02 |
| | | | | | | | | | | | | |
| | N17 | 1403 | 11.8 | 4.6 | 385 | 222 | 14.3 | | 1.54 | | 76.7 | 0.02 |
| VAM-AMPS-MA | M1 | 1422 | 4.5 | 3.3 | 362 | 374 | 68.0 | | 1.54 | | 100 | 0.02 |
| VAM-AMPS-DMI | D1 | 1407 | 4.5 | 3.3 | 362 | 152 | 50.6 | | 1.54 | | 100 | 0.005 |
| | D2 | 1407 | 4.5 | 3.3 | 362 | 152 | 50.6 | | 1.54 | | 100 | 0.02 |
| | D3 | 1407 | 4.5 | 3.3 | 362 | 152 | 50.6 | | 1.54 | | 100 | 0.1 |
| VAM-AMPS-ITA | I1 | 1476 | 4.5 | 3.3 | 173 | 153 | 19.1 | | | 1.54 | 160 | 0.005 |
| | I2 | 1415 | 4.5 | 3.3 | 233 | 153 | 41.3 | | | 1.54 | 128 | 0.1 |
| | I3 | 1415 | 4.5 | 3.3 | 233 | 153 | 41.3 | | | 1.54 | 128 | 0.2 |
| VAM-AMPS-Veova10 | V1 | 1415 | 10 | 34.7 | 277 | 325 | 29.7 | | | 1.54 | 100 | 0.02 |
| | V2 | 1307 | 10 | 34.7 | 277 | 325 | 29.7 | 84.6 | | 1.54 | 100 | 0.1 |

FIG. 5B (Table 2B) – Homopolymers and Co-polymers

| | | **Initial charge, phr** | | | | **Delay feed, phr** | | | **Initiator, phr** | | | **Saponification** |
|---|---|---|---|---|---|---|---|---|---|---|---|---|
| **Polymer** | **Sample** | VAM | AMPS | NVP | MeOH | AMPS | VAM | NVP | Trig EHP | Trig 23 | MeOH | NaOH/PVAc (mole%) |
| **VAM-AMPS** | A1,A2 | 2000 | 37 | | 1475 | 440 | 4140 | | 4 | | 185 | 0.02 |
| **VAM-NVP** | U4005 | 2840 | | 50 | 1900 | | 4180 | 341 | | 8 | 254 | 0.02 |
| **VAM homo polymer** | E205 | 1750 | | | 3840 | | 1260 | | 7.5 | | 340 | 0.005 |

MODIFIED POLYVINYL ALCOHOL RESIN WITH IMPROVED SOLUBILITY IN ALCOHOL MIXTURES

FIELD OF THE DISCLOSURE

The present disclosure relates in general to modified polyvinyl alcohol resins, and more particularly, to modified polyvinyl alcohol resins exhibiting improved solubility in alcohol mixtures.

BACKGROUND

Copolymers of polyvinyl alcohol (PVOH) with 2-acrylamido-2-methylpropanesulfonic acid in free acid form or as a salt of the free acid (AMPS) are known in the art and may be referred to as a PVOH-co-AMPS copolymer. These copolymers, due to their superior cold-water solubility and resistance to oxidizing chemicals, are commonly used to form water soluble films for unit dose packaging of detergents and harsh chemicals.

However, sulfonic acid modified PVOH copolymers, including PVOH-co-AMPS, do not exhibit superior solubility in solutions containing alcohol, such as alcohol mixed with water. There are applications in the industry where it would be beneficial to have a sulfonic acid modified PVOH that exhibits improved solubility in alcohol mixtures, including but not limited to formulations for ink, paint, paper coatings, emulsions, and films.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a sulfonic acid modified polyvinyl alcohol resin comprising from 0.1 to 15 mol % of a first comonomer comprising sulfonic acid groups. The modified polyvinyl alcohol resin has a hydroxyl unit content measured by NMR of at least 65 mol % and a gel fraction of 3.2 or less. Further, the modified polyvinyl alcohol resin has a disintegration time of 85 seconds or less, as measured in a mixture of 50 vol % water and 50 vol % isopropyl alcohol according to the Solution Cast Disintegration Test Method at 23° C. Additionally, the modified polyvinyl alcohol resin has a hard component present in a component ratio of 10% or greater and 55% or less and having a relaxation time of 0.0091 milliseconds or greater and 0.0104 milliseconds or less, as measured by the pulsed NMR Solid Echo method at 80° C.

In another aspect, embodiments herein are directed toward methods of producing the above described sulfonic acid modified polyvinyl alcohol resins. The methods may include copolymerizing a vinyl ester monomer with a sulfonic acid comonomer and incorporating a second comonomer to produce the sulfonic acid modified polyvinyl alcohol resin.

In yet another aspect, embodiments herein are directed toward an ink, paint, paper coatings, emulsions, or films comprising the sulfonic acid modified polyvinyl alcohol resin.

Other aspects and advantages of the claimed subject matter will be apparent from the following description and the appended claims.

BRIEF DESCRIPTION OF DRAWINGS

FIG. 5A is a table detailing the formulations used to produce terpolymers investigated herein.

FIG. 5B is a table detailing the formulations used to produce comparative homopolymers and co-polymers.

DETAILED DESCRIPTION

Figure 1:
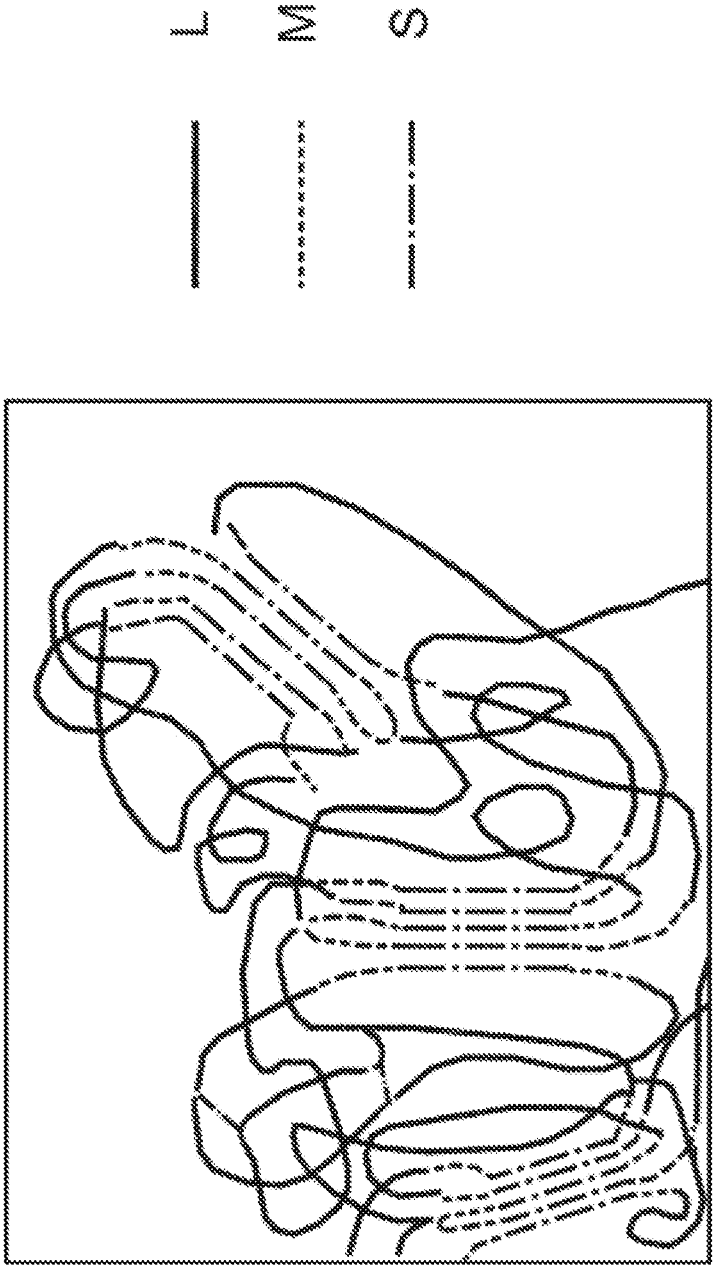
FIG. 1 is a schematic diagram of the internal structure of an example modified PVOH resin according to one or more embodiments of the present disclosure

The present disclosure provides compositions and methods for producing sulfonic acid modified PVOH resins that were surprisingly found to exhibit improved solubility in mixtures of water and alcohol.

Vinyl alcohol copolymers and terpolymers useful in embodiments disclosed herein may be formed via the copolymerization of a vinyl ester monomer and one or more selected comonomers via bulk polymerization, solution polymerization, emulsion polymerization, suspension polymerization, and the like. Vinyl ester monomers (primary monomer) may include various aliphatic acids, such as vinyl formate, vinyl acetate, vinyl butyrate, vinyl pivalate, and vinyl versatate, among others.

Copolymers and terpolymers according to embodiments herein may include a first comonomer, namely a sulfonic acid containing comonomer. For the sulfonic acid modified polymers herein, examples of suitable sulfonic acid comonomers containing sulfonic acid groups may include but are not limited to vinyl sulfonic acid, allyl sulfonic acid, ethylene sulfonic acid, 2-acrylamido-1-methylpropanesulfonic acid, 2-acrylamido-2-methylpropanesulfonic acid (AMPS), 2-methacrylamido-2-methylpropanesulfonic acid, 2-sulfoethyl acrylate, and salts thereof, among others. In some embodiments, the sulfonic acid containing comonomer is 2-acrylamido-2-methylpropanesulfonic acid (AMPS).

The sulfonic acid containing comonomers may be incorporated into the polymer in amounts ranging from about 0.1 to about 15 mol %, from 0.5 to about 10 mol %, or from about 1 to about 6 mol %, such as in the range from about 2 to about 5 mol % or from about 3 to about 4.25 mol % in other embodiments. In some embodiments, the sulfonic acid containing comonomer is incorporated in an amount of at least 3.5 mol % or at least 4 mol %. In other words, the sulfonic acid containing comonomers may be incorporated into the polymer in amounts from a lower limit of 0.5, 1, 1.5, 2, 2.5, 3, 3.5, 4, 4.5, or 5 mol % to an upper limit of 4, 4.5, 5, 5.5, 6, 6.5, 7, 7.5, 8, 8.5, 9, 9.5, or 10 mol %, where any lower limit may be combined with any mathematically compatible upper limit.

Where a second or additional comonomer(s) is(are) introduced, such as to produce a terpolymer of the sulfonic acid modified PVOH, suitable comonomers may include but are not limited to a pyrrolidone, a carboxylate, or an alkyl ester comonomer.

A PVOH terpolymer comprising the first and second comonomers may contain between about 0.01 mol % to about 20 mol % of the second comonomer in some embodiments. In other embodiments, the PVOH terpolymer may have from about 0.05 mol % to about 15 mol % of the second comonomer, such as from about 0.1 mol % to about 10 mol % or from about 0.1 mol % to about 5 mol %. In various embodiments, each of the first and second comonomers may be incorporated into the polymer in amounts from a lower limit of 0.1, 0.2, 0.5, 1, 1.5, 2, 2.5, 3, 3.5, 4, 4.5, or 5 mol % to an upper limit of 3, 3.5, 4, 4.5, 5, 5.5, 6, 6.5, 7, 7.5, 8, 8.5, 9, 9.5, 10, 11, 12, 13, 14, or 15 mol %, where any lower limit may be combined with any mathematically compatible upper limit.

A total amount of comonomers, inclusive of the sulfonic acid containing comonomer and any second or additional comonomers, incorporated into the polymer may range from 0.5 mol % to 30 mol %, such as from about 1 to about 25 mol %, from about 2 to about 15 mol %, or from about 3 to about 10 mol % in various embodiments. In some embodiments, the total amount of comonomers incorporated into the polymer is in an amount from a lower limit of 0.5, 1, 1.5, 2, 2.5, 3, 3.5, 4, 4.5, or 5 mol % to an upper limit of 4, 4.5, 5, 5.5, 6, 6.5, 7, 7.5, 8, 8.5, 9, 9.5, 10, 11, 12, 13, 14, 15, 20, 25, or 30 mol %, where any lower limit may be combined with any mathematically compatible upper limit.

Embodiments of the PVOH terpolymer may comprise between about 0.1 mol % to about 15 mol % of the second comonomer, and between about 0.1 mol % to about 15 mol % of the first comonomer. In some embodiments, the PVOH terpolymer may comprise between about 0.25 mol % to about 10 mol % of the second comonomer, and between about 2 mol % to about 10 mol % of the first comonomer. In other embodiments, the PVOH terpolymer may comprise between about 0.25 mol % to about 6 mol % of the second comonomer, and between about 2 or 3 mol % to about 8 mol % of the first comonomer. In yet other embodiments, the PVOH terpolymer may comprise between about 0.3 mol % to about 5.4 mol % of the second comonomer, and between about 3.6 mol % to about 9.4 mol % of the first comonomer. In still further embodiments, the PVOH terpolymer may comprise between about 0.1, 0.2, 0.25, 0.3, 0.35, 0.4, 0.45, of 0.5 mol % to about 1.0, 2.0, 3.0, 3.5, 4.0, 4.5, 5.0, 5.4, 5.8, 6.0, 6.5, 7.0, 7.5, 8.0, 8.5, 9.0, 9.5, 10, 12.5, or 15 mol % of the second comonomer, and between about 0.1, 0.2, 0.3, 0.4, 0.5, 0.75, 1.0, 1.5, 2.0, 2.5, 3.0, 3.3, 3.6, 4.0, 4.5, or 5.0 mol % to about 3.0, 3.5, 4.0, 4.5, 5.0, 5.5, 6.0, 6.5, 7.0, 7.5, 8.0, 8.5, 9.0, 9.4, 10.0, 12.5, or 15.0 mol % of the first comonomer, where any lower limit may be combined with any mathematically compatible upper limit.

Copolymers according to embodiments herein may thus include from about 65 to about 99.5 mole percent vinyl alcohol (inclusive of vinyl ester monomer units, the amount of which depending upon the degree of saponification, as known in the art). In other embodiments, copolymers according to embodiments herein may include vinyl alcohol (inclusive of vinyl ester monomers, depending upon the degree of saponification), in an amount from a lower limit of 70, 75, 80, 85, 86, 87, 88, 89, 90, 91, 92, 93, 94, 95, or 95 mol % to an upper limit of 90, 91, 92, 93, 94, 95, 96, 97, 98, 99, or 99.5 mol %, where any lower limit may be combined with any mathematically compatible upper limit.

Suitable pyrrolidone comonomers may include compounds having a polymerizable carbon-carbon double bond and a pyrrolidone ring substituent group represented by the following formula:

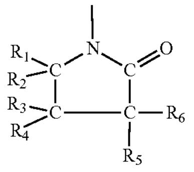

wherein R1, R2, R3, R4, R5 and R6 are each individually selected from a hydrogen atom or an alkyl group, such as an alkyl group having 1 to 8 carbon atoms. Examples of the group represented by the general formula (I) are 2-oxopyrrolidin-1-yl group, 3-propyl oxopyrrolidin-1-yl group, 5-methyl-2-oxopyrrolidin-1-yl group, 5,5-dimethyl oxopyrrolidin-1-yl group, 3,5-dimethyl-2-oxopyrrolidin-1-yl group, and the like. The carbon-carbon double bond contained in the pyrrolidone comonomer may include vinyl, allyl, styryl, acryloxy, methacryloxy, vinyloxy, allyloxy, and other groups, that are copolymerizable with the above noted vinyl esters of aliphatic acids and have a high alkali resistance at the time of copolymer hydrolysis to form the vinyl alcohol copolymer. Examples of the pyrrolidone comonomers may include N-vinyl-2-pyrrolidone (NVP), N-vinyl-3-propyl-2-pyrrolidone, N-vinyl-5-methyl-2-pyrrolidone, N-vinyl-5,5-dimethyl-2-pyrrolidone, N-vinyl-3,5-dimethyl-2-pyrrolidone, and N-allyl-2-pyrrolidone, among others.

The pyrrolidone comonomers may be incorporated into the polymer in amounts ranging from about 0.25 to about 4 mol % in some embodiments, or from about 0.25 to about 3 mol %, or from about 0.35 mol % to about 2.9 mol %. In embodiments, the pyrrolidone comonomer is incorporated into the polymer in amounts from a lower limit of 0.25, 0.3, 0.35, 0.5, 0.75, 1, 1.25, 1.5, 1.75, 2, 2.25, or 2.5 mol % to an upper limit of 2, 2.25, 2.5, 2.75, 2.9, 3, 3.25, 3.5, 3.75 or 4 mol %, where any lower limit may be combined with any mathematically compatible upper limit.

In some embodiments, the sulfonic acid modified polyvinyl alcohol resin comprises from 4 mol % to 8 mol % of the first comonomer and from 0.25 to 3 mol % of the pyrrolidone comonomer. For example, the sulfonic acid modified polyvinyl alcohol resin of some embodiments comprises from 4 mol % to 6.5 or 7 mol % of the first comonomer and from 0.35 to 2.9 mol % of the pyrrolidone comonomer.

Suitable carboxylate-containing comonomers include those derived from carboxylic acid vinyl monomers and their esters. Such carboxylate-containing comonomers include but are not limited to acrylic acid, crotonic acid, methyl acrylate (MA), methacrylic acid, methyl methacrylate, maleic acid, itaconic acid, dimethyl itaconate and fumaric acid.

The carboxylate-containing comonomers may be incorporated into the polymer in amounts ranging from about 0.1 or 0.25 to about 5.4 or 6 mol % in some embodiments, or from about 0.5 to about 3.5 mol %, such as in the range from about 0.75 to about 3.25 mol % or from about 1 to about 3 mol % in other embodiments. In embodiments, the carboxylate-containing comonomers is incorporated into the polymer in amounts from a lower limit of 0.25, 0.3, 0.35, 0.5, 0.75, 1, 1.25, 1.5, 1.75, 2, 2.25, or 2.5 mol % to an upper limit of 2, 2.25, 2.5, 2.75, 3, 3.25, 3.5, 3.75, 4, 4.25, 4.5, 4.75, 5, 5.5, or 6 mol %, where any lower limit may be combined with any mathematically compatible upper limit.

In some embodiments, the sulfonic acid modified polyvinyl alcohol resin comprises from 2 or 3 mol % to 8 mol % of the first comonomer and from 0.1 to 6 mol % of the carboxylate-containing comonomers comonomer. For example, the sulfonic acid modified polyvinyl alcohol resin of some embodiments comprises from 3 mol % to 6.5 or 7 mol % of the first comonomer and from 0.25 to 5.4 mol % of the carboxylate-containing comonomers.

Suitable alkyl ester comonomers include various alkyl esters containing a polymerizable vinyl. Alkyl esters useful according to embodiments herein may have a generic structure of a branched ester as shown below:

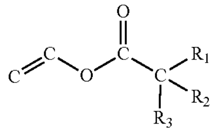

where $R_1$, $R_2$ and $R_3$ are each independently alkyl groups, such as $C_{1-8}$ alkyl groups, and the total number of carbon atoms in $R_1$, $R_2$ and $R_3$ together is from 6 to about 20, the monomer unit thus containing a tertiary substituted carbon. The tertiary alkyl groups are very resistant to hydrolysis by alkali, thus after saponification this structure remains in the polymer. In some embodiments, the total number of carbon atoms in $R_1$, $R_2$ and $R_3$ together is from 6 to about 12. In other embodiments, the alkyl ester may include vinyl esters of versatic acid commercially available under the mark VEOVA from the Shell Chemical Company or sold as EXXAR neo vinyl esters by the ExxonMobil Chemical Company. In some embodiments, suitable comonomers may comprise vinyl neodecanoate, such as under the trade name VEOVA 10 by the Shell Chemical Company.

The alkyl ester comonomers may be incorporated into the polymer in amounts ranging from about 0.25 to about 4 or 6 mol %, or from about 0.5 to about 3.8 mol % in some embodiments, such as in the range from about 0.75 to about 3.25 mol % or from about 1 to about 3 mol % in other embodiments. In embodiments, the alkyl ester comonomer is incorporated into the polymer in amounts from a lower limit of 0.25, 0.3, 0.35, 0.5, 0.75, 1, 1.25, 1.5, 1.75, 2, 2.25, or 2.5 mol % to an upper limit of 2, 2.25, 2.5, 2.75, 3, 3.25, 3.5, 3.75 or 4 mol %, where any lower limit may be combined with any mathematically compatible upper limit.

In some embodiments, the sulfonic acid modified polyvinyl alcohol resin comprises from 2 mol % to 8 mol % of the first comonomer and from 2 to 6 mol % of the alkyl ester comonomer. For example, the sulfonic acid modified polyvinyl alcohol resin of some embodiments comprises from 3 mol % to 7 mol % of the first comonomer and from 0.5 to 3.8 mol % of the alkyl ester comonomers.

The above-described vinyl ester monomers and comonomers may be copolymerized via bulk polymerization, solution polymerization, emulsion polymerization, suspension polymerization, and the like. The vinyl ester copolymer or terpolymer thus obtained may be saponified, and the resulting PVOH copolymer or terpolymer may have a degree of hydrolysis measured by JIS K6726 in the range from about 65 to about 99% in some embodiments; in the range from about 75 to about 95% in other embodiments. The resulting PVOH copolymers and terpolymers may have a hydroxyl content, as measured by $C^{13}$NMR analysis, or at least 65 mol %. In yet other embodiments, the PVOH copolymer or terpolymer may have a hydroxyl unit content indicated by $C^{13}$NMR analysis of at least about 66 mol %.

The PVOH copolymers or terpolymers according to embodiments herein may have a relative molecular weight indicated by a characteristic viscosity in the range from about 2 to about 60 cps, in some embodiments; in the range from about 10 to about 60 cps in other embodiments, in the range from about 3 to about 50 cps in yet other embodiments; or from about 5 to about 40 cps in further embodiments. In yet other embodiments, PVOH copolymers or terpolymers according to embodiments herein may have a relative molecular weight indicated by a characteristic viscosity in the range from a lower limit of 2, 3, 5, 7, 10, 12, 12.2 or 15 cps to an upper limit of 40, 50, 55, 57.4, 60, 65, 70, 75, or 80 cps, where any lower limit may be combined with any upper limit. The characteristic viscosity is determined on a 4 wt % solution of the polymer in water, measured on a Brookfield viscometer at 20° C. by JIS K6726.

In another aspect, it was surprisingly discovered that when a sulfonic acid modified PVOH copolymer as described above is produced having a particular component ratio and relaxation time, as measured by the pulsed NMR Solid Echo method at 80° C., the copolymer exhibited improved solubility in water-alcohol mixtures. The Pulse NMR characterization is described as follows and is further detailed in the Experimental Results provided below.

FIG. 1 is a schematic diagram of the internal structure of an example modified PVOH resin according to one or more embodiments of the present disclosure. As shown in FIG. 1, the resin's internal structure comprises three components, i.e., a first component L, a second component M and a third component S.

The component S is a component having a short relaxation time in a pulsed NMR measurement and refers to a "hard" component with low molecular mobility. In contrast, the component L is a component having a long relaxation time in a pulsed NMR measurement and refers to a "soft" component with high molecular mobility. The component M has a relaxation time in between those of the component S and the component L in a pulsed NMR measurement, and therefore has a molecular mobility between those of the component S and the component L.

In other words, the component S substantially corresponds to the crystalline regions and crosslinked portions of the resin, while the component L corresponds to the amorphous regions of the resin, and the component M to the "interface" regions of the resin between the crystalline and amorphous regions of the resin.

Figure 2:
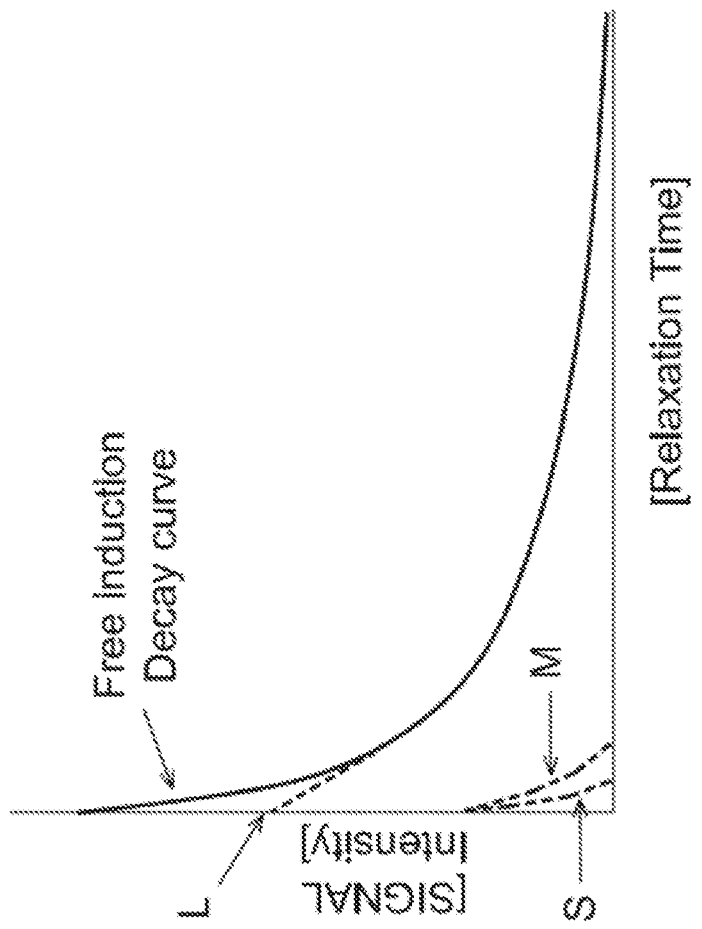
FIG. 2 is a conceptual diagram illustrating three-component analysis of the internal structure of a resin by pulsed NMR measurement.

FIG. 2 is a conceptual diagram illustrating the three-component analysis of the internal structure of a resin by pulsed NMR measurement. The pulsed NMR measurement of the resin gives a free induction decay curve of $^1H$ spin-spin relaxation. The obtained free induction decay curve can be waveform-separated into three curves stemming from the respective three components, i.e., the hard component S, the middle component M, and the soft component L in ascending order of relaxation time. That is, the actual measured free induction decay curve may also be obtained by superimposing all three free induction decay curves derived from the above-mentioned components S, M and L.

A method of separating and analyzing the three components via pulsed NMR methodology is known, and examples of the literature include DIC Technical Review No. 12/2006, "Phase separation structure analysis of polyurethane resin by solid-state NMR (high-resolution NMR and pulsed NMR)", or document JP 2018-2983 A.

When a sulfonic acid modified PVOH copolymer as described above is produced having a particular component ratio and relaxation time, as measured by the pulsed NMR Solid Echo method at 80° C., the copolymer exhibited improved solubility in water-alcohol mixtures.

In some embodiments, the sulfonic acid modified PVOH copolymer comprises a hard component present in a component ratio of 10% or greater and 55% or less and having a relaxation time of 0.0091 milliseconds or greater and 0.0104 milliseconds or less, as measured by the pulsed NMR Solid Echo method at 80° C. In other embodiments, the sulfonic acid modified PVOH copolymer comprises a hard component present in a component ratio of 15% or greater and 50% or less and having a relaxation time of 0.0091 milliseconds or greater and 0.0102 milliseconds or less, as measured by the pulsed NMR Solid Echo method at 80° C. In yet other embodiments, the sulfonic acid modified PVOH copolymer comprises a hard component present in a component ratio of 16% or greater and 50% or less and having a relaxation time of 0.0092 milliseconds or greater and 0.0101 milliseconds or less, as measured by the pulsed NMR Solid Echo method at 80° C. In various embodiments, the modified polyvinyl alcohol resin comprise a hard component present in a component ratio from a lower limit of 0.1, 0.5, 1, 2.5, 5, 7.5, 10, 11, 12, 13, 14, 15, 16, 17, 18, or 20% to an upper limit of 30, 35, 40, 45, 47.5, 50, 52.5, 55, 57.5, or 60%, where any lower limit may be combined with any upper limit. Still further, embodiments of the modified polyvinyl alcohol resin may have a hard component having a relaxation time from a lower limit of 0.00905, 0.0091, 0.00915, 0.0092, 0.00925, 0.0093, 0.00935, 0.0094, 0.00945, or 0.0095 milliseconds to an upper limit of 0.0097, 0.00975, 0.0098, 0.00985, 0.0099, 0.01, 0.0101, 0.0102, 0.0103, or 0.0104 milliseconds, as measured by the pulsed NMR Solid Echo method at 80° C., where any lower limit may be combined with any upper limit.

Further, embodiments of the modified polyvinyl alcohol resin comprise a soft component present in a component ratio of 10% or greater and 35% or less and having a relaxation time of 0.418 milliseconds or more and 1.2 milliseconds or less, as measured by the pulsed NMR Solid Echo method at 80° C. In other embodiments, the modified polyvinyl alcohol resin comprises a soft component present in a component ratio of 10% or greater and 33% or less and having a relaxation time of 0.418 milliseconds or more and 1.2 milliseconds or less, as measured by the pulsed NMR Solid Echo method at 80° C. In yet other embodiments, the modified polyvinyl alcohol resin comprises a soft component present in a component ratio of 10.5% or greater and 30% or less and having a relaxation time of 0.47 milliseconds or more and 0.97 milliseconds or less, as measured by the pulsed NMR Solid Echo method at 80° C. In various embodiments, the modified polyvinyl alcohol resin comprise a soft component present in a component ratio from a lower limit of 9.8, 9.9, 10, 10.5, 10.6, 10.7, 10.8, 11, 11.5 or 12% to an upper limit of 29, 29.5, 30, 31, 32, 33, 34, or 35%, where any lower limit may be combined with any upper limit. Still further, embodiments of the modified polyvinyl alcohol resin may have soft component having a relaxation time from a lower limit of 0.418, 0.419, 0.42, 0.425, 0.43, 0.44, 0.45, 0.46, 0.47, 0.472, 0.474, 0.476, 0.477, 0.478, 0.479, or 0.48 milliseconds to an upper limit of 0.79, 0.8, 0.85, 0.9, 0.95, 0.96, 0.97, 0.98, 0.99, 1.0, 1.05, 1.1, 1.15, or 1.2 milliseconds, as measured by the pulsed NMR Solid Echo method at 80° C., where any lower limit may be combined with any upper limit.

Embodiments of the modified polyvinyl alcohol resin may have excellent solubility in mixtures of water and alcohol. The sulfonic acid modified PVOH resins according to the compositions and methods of the present disclosure were surprisingly found to exhibit improved solubility in water and alcohol mixtures, in contrast with previous sulfonic acid modified PVOH resins known in the art. Improved solubility may be exhibited, for example, by faster disintegration times as compared to previous sulfonic acid modified PVOH resins known in the art. Embodiments of the modified polyvinyl alcohol resins herein may have a disintegration time of 85 seconds or less, 80 seconds or less, 70 seconds or less, 60 seconds or less, 55 seconds or less, 50 seconds or less, 45 seconds or less, 40 seconds or less, 35 seconds or less, or 30 seconds or less, as measured in a mixture of 50 vol % water and 50 vol % isopropyl alcohol according to the Solution Cast Disintegration Test Method at 23° C. In other embodiments, the modified polyvinyl alcohol resins herein may have a disintegration time from a lower limit of 20, 22, 24, 26, 28, or 30 seconds, to an upper limit of 50, 52, 54, 56, 58, 60, 70, 80, 90, 100, or 110 seconds, where any lower limit may be combined with any upper limit, where the disintegration time is measured in a mixture of 50 vol % water and 50 vol % isopropyl alcohol according to the Solution Cast Disintegration Test Method at 23° C. For example, the sulfonic acid modified PVOH resin of the present disclosure may have a disintegration time of about 24 to about 54 seconds in a mixture of 50 wt % water and 50 wt % isopropyl alcohol according to the Solution Cast Disintegration Test Method at 23° C.

As noted above, the hard component may be considered the crystalline or crosslinked portion of the sulfonic acid modified PVOH resin and may represent a portion of the polymer that may be less soluble in solvents or solvent mixtures, such as water-alcohol mixtures. The insoluble polymers may be formed due to crosslinking during initial reaction or during processing. However, to maintain high solubility of the resins of embodiments herein, the resins may be produced and processed in a manner to have a low or nil gel content. Gel content or gel fraction may be measured, for example, by dissolving a known weight of the resin in a solvent, such as a water-alcohol mixture, and then filtering the sample through a mesh, thereby separating the insoluble component and the soluble component. Following drying of the filter residue, the weight of the insoluble resin may be used to calculate the gel fraction (filter residue weight divided by initial weight of resin). Embodiments of the sulfonic acid modified PVOH resin herein may have a gel fraction of 3.2 or less, 3.0 or less, 2.5 or less, 2.0 or less, 1.5 or less, 1.0 or less, 0.8 or less, 0.6 or less, 0.5 or less, or even as low as no gel content, as measured in a 50-50 (vol %) mixture of water and isopropanol, as measured based on the insoluble content of the films used in the Solution Cast Disintegration Test Method described below.

In another aspect, a method of producing a sulfonic acid modified PVOH resin exhibiting improved solubility in water and alcohol mixtures may include copolymerizing a vinyl ester monomer with a sulfonic acid comonomer, and incorporating one or more secondary comonomers such that the resulting sulfonic acid modified PVOH resin has one or more of the properties outlined above, including gel content, disintegration time, first comonomer content, second comonomer content, hard component content and relaxation time, soft component content and relaxation time, degree of hydrolysis, and viscosity.

As noted above, vinyl alcohol copolymers and terpolymers useful in embodiments disclosed herein may be formed via the copolymerization of a vinyl ester monomer and one or more selected comonomers via bulk polymerization, solution polymerization, emulsion polymerization, suspension polymerization, and the like. Reaction conditions may vary based upon the monomer and comonomers being used, and the reactions may be carried out in a single stage or multiple stages.

A free radical yielding polymerization initiator may be utilized for the copolymerization reactions and may be, for example, 2-ethylhexyl peroxydicarbonate (Trigonox EHP), 2,2'-azobisisobutylronitrile (AIBN), t-butyl peroxyneodecanoate (Trigonox 23), bis(4-t-butylcyclohexyl) peroxydicarbonate, di-n-propyl peroxydicarbonate, di-n-butyl peroxydicarbonate, di-acetyl peroxydicarbonate, di-s-butyl peroxydicarbonate. Essentially any initiator able to generate free radicals can be used. The amount of polymerization initiator fed to the reaction zone(s) may be, for example, about 0.0001 to about 1 wt. % based on the total amount of reactants being added.

Optionally, acetaldehyde (AcH) as a chain transfer agent can be continuously fed to the reaction zone(s) with the other components. The amount of AcH may, for example, be up to about 0.2 wt. % based on the total amount of reactants being added.

A solvent for the comonomers, the polymerization initiator and the copolymer being formed in the reaction zones is generally employed in the process. Suitable solvents are, for example, methanol, ethanol, and propanol. The amount of solvent fed to the reaction zone(s) may be, for example, about 10 to about 40 wt. % based on the total amount of reactants being added.

The amount of first comonomer and second comonomer fed to the reaction zone(s) is, for example, about 0.1 to about 30 wt %, based on the total amount of reactants being added, so as to achieve the compositional content of the copolymer or terpolymer as described earlier. Monomer, first comonomer, and second comonomer may be added at to the reactor for reaction together, in some embodiments, or may be added stage-wise. For example, a vinyl ester monomer, such as vinyl acetate, may be added to the reactor and reaction initiated and continued for a period of time before the first comonomer and second comonomer are added to the reactor.

The average residence time of the reactants in the reaction zone(s) may be, for example, in the range of about 30 to about 360 minutes, such as in the range from about 30 to about 240 minutes or from about 60 to about 180 minutes. Reaction temperatures may be, for example, from about 55° C. to about 85° C., such as from about 60° C. to about 80° C. The pressure in the reaction zone(s) may be at ambient pressure (about 0 bar gauge (barg) (about 0 psig)) in some embodiments. In other embodiments, pressure in the reaction zones may be slightly above atmospheric pressure, for example, in the range from about 0.1 to about 2.1 barg (about 1 to about 30 psig), such as from about 0.2 to about 1.1 barg (about 3 to about 15 psig).

The residence times and temperatures in the reaction zone(s) are generally sufficient to result in the polymerization of substantially all of the first and second comonomers fed to the system, although a small percentage of vinyl ester added to the system may remain unpolymerized.

In carrying out the saponification of the resulting in copolymers and terpolymers, the reaction effluent may, for example, be fed to a stripping column to remove the more volatile components such as unreacted vinyl ester monomer. The resulting "paste" is then mixed with an aqueous solution of a strong base such as sodium hydroxide, e.g., containing about 10 to about 50 wt. % of sodium hydroxide to provide base at a caustic mole ratio (CMR, ratio of moles of base to moles of acetate in the copolymer) of about 0.01 to about 0.1. Optionally, an amount of a volatile alcohol, e.g., methanol, is also added to reduce the solids content in the paste to about 30 to about 65 wt. %. The resulting mass is then allowed to react at a temperature from about room temperature (RT, about 22° C.) to about 50° C. for a period of about 5 minutes to about 24 hours to obtain a percent hydrolysis of the acetate groups in the copolymer to hydroxyl groups in the range of about 60 to about 99+%.

The resulting sulfonic acid modified PVOH resins according to embodiments herein may be used in formulations for ink, paint, paper coatings, emulsions, and films. Due to their excellent solubility in water-alcohol mixtures, such sulfonic acid modified PVOH resins according to embodiments herein may be used in applications for which PVOH-co-AMPS polymers cannot typically be used due to their limited solubility in water-alcohol mixtures.

EXPERIMENTAL METHODS AND EXAMPLES

Production of Sulfonic Acid Modified PVOH Resins and Terpolymers

The sample modified PVOH resins and comparative samples represented in TABLE 1A and 1B below were produced according to the following methods. In addition to the lab-prepared samples, comparative commercially produced resins were also tested for comparison to embodiments herein. Commercial resins tested included SELVOL E205 (E205), and SELVOL ULTILOCK 4005 (U4005), each available from Sekisui Specialty Chemicals.

TABLE 1A

| Embodiment Samples | | | | | | | |
|---|---|---|---|---|---|---|---|
| Modified PVOH | Sample # | Degree of hydrolysis Mol % | 4% Visc (cps) | AMPS (mol %) | Second Comonomer (mol %) | OAc (mol %) | OH (mol %) |
| VAM- | N1 | 92.6 | 15.0 | 6.03 | 0.67 | 5.10 | 88.20 |
| AMPS-NVP | N2 | 94.6 | 13.1 | 6.52 | 2.62 | 6.09 | 84.77 |
| Terpolymer | N3 | 93.2 | 13.3 | 4.22 | 0.80 | 3.96 | 91.02 |
| | N4 | 92.5 | 13.7 | 4.15 | 2.34 | 4.33 | 89.18 |
| | N5 | 93.7 | 13.6 | 5.36 | 1.67 | 3.36 | 89.61 |
| | N6 | 92.7 | 12.2 | 4.00 | 2.72 | 4.09 | 89.19 |
| | N7 | 93.2 | 13.6 | 6.19 | 2.93 | 7.37 | 83.51 |
| | N8 | 94.4 | 13.6 | 6.46 | 0.63 | 5.74 | 87.17 |
| | N9 | 93.5 | 13.1 | 5.06 | 1.65 | 4.74 | 88.55 |
| | N10 | 91.4 | 13.8 | 6.10 | 0.55 | 6.61 | 86.74 |
| | N11 | 92.5 | 13.7 | 6.32 | 0.35 | 5.13 | 88.20 |
| | N12 | 94.6 | 14.3 | 4.35 | 2.28 | 5.66 | 87.71 |
| | N13 | 93.1 | 13.6 | 5.86 | 2.66 | 7.18 | 84.30 |
| | N14 | 92.9 | 13.2 | 6.21 | 2.28 | 9.18 | 82.33 |

TABLE 1A-continued

| Embodiment Samples | | | | | | | | |
|---|---|---|---|---|---|---|---|---|
| Modified PVOH | Sample # | Degree of hydrolysis Mol % | 4% Visc (cps) | AMPS (mol %) | Second Comonomer (mol %) | OAc (mol %) | OH (mol %) |
| VAM-AMPS-MA | M1 | 97.8 | 19.6 | 6.81 | 1.70 | 2.00 | 89.49 |
| VAM-AMPS-DMI | D1 | 78.3 | 19.7 | 3.64 | 5.36 | 19.75 | 71.25 |
| VAM-AMPS-ITA | I1 | 79.0 | N/A | 6.54 | 0.25 | 26.75 | 66.46 |
| VAM-AMPS-Veova10 | V1 | 92.5 | 57.4 | 4.57 | 3.84 | 5.42 | 86.17 |

TABLE 1B

| Comparative Samples | | | | | | | |
|---|---|---|---|---|---|---|---|
| Modified PVOH | Sample # | Degree of hydrolysis Mol % | 4% Visc (cps) | AMPS (mol %) | Second Comonomer (mol %) | OAc (mol %) | OH (mol %) |
| VAM-AMPS-NVP | N15 | 94.9 | 13.9 | 3.94 | 0.74 | 4.03 | 91.29 |
| | N16 | 93.6 | 14.0 | 3.83 | 0.80 | 4.39 | 90.99 |
| | N17 | 96.0 | 15.5 | 3.75 | 0.73 | 2.66 | 92.87 |
| VAM-AMPS-DMI | D2 | 90.4 | 66.3 | 4.30 | 5.23 | 8.72 | 81.75 |
| | D3 | 93.6 | 45.2 | 5.13 | 4.94 | 5.73 | 84.20 |
| VAM-AMPS-ITA | I2 | 86.4 | 19.3 | 5.19 | 1.42 | 12.28 | 81.11 |
| | I3 | 93.5 | 15.2 | 7.25 | 2.10 | 5.94 | 84.71 |
| VAM-AMPS-Veova10 | V2 | 96.0 | 62.3 | 2.24 | 3.29 | 2.22 | 92.25 |
| VAM-AMPS Copolymer | A1 | 95.7 | 11.9 | 4.67 | 0 | 4.57 | 90.75 |
| | A2 | 96.2 | 11.1 | 4.42 | 0 | 4.35 | 91.23 |
| | A3 | 92.5 | 11.7 | 4.09 | 0 | 6.06 | 89.85 |
| Commercial VAM-NVP Copolymer | U4005 | 98.5 | 10.5 | 0 | 4.59 | 0 | 95.4 |
| Commercial VAM homopolymer | E205 | 87.4 | 5.2-6.2 | 0 | 0 | 12.6 | 87-89 |

VAM-AMPS-NVP Terpolymer (Samples N1-N17)

An agitator, condenser, thermometer, water bath and 5 L reactor with nitrogen introduction port were prepared. Vinyl acetate monomer (VAM), NVP, AMPS 50% aqueous solution and MeOH were put in the reactor at the amounts listed in Tables 2A and 2B (provided as FIGS. 5A and 5B). The mixture was agitated well at 150 rpm, the reactor was heated until the inner temperature reached 65° C., and then an initiator feed was started with tert-Butyl peroxyneodecanoate (TRIGONOX 23) MeOH solution. After 30 minutes NVP and AMPS 50% aqueous solutions were fed continuously. After 150 minutes, the initiator and comonomer feed were stopped, and then heating and mixing was continued for 1 hour, with MeOH added to finish the reaction. The polyvinyl acetate (PVAc) solution was fed to a stripping column where methanol vapor was introduced to remove unreacted vinyl acetate. Afterwards solids were adjusted to 35 wt % with methanol. Sodium hydroxide (NaOH, 50% aq) was mixed with methanol to produce a 4 wt % solution. This was mixed into the polymer solution so that the mole ratio of NaOH and PVAc was 0.02. The mixture was put in a 40° C. water bath for 2 hours, and subsequently the saponified polyvinyl alcohol was ground and then put in an 80° C. oven for 1.5 hours.

VAM-AMPS-MA Terpolymer (Sample M1)

The procedure described above for VAM-AMPS-NVP terpolymer was followed, except that MA was used instead of NVP above. The other conditions are the same as above.

VAM-AMPS-ITA (Samples I1-I3) and VAM-AMPS-DMI (Samples D1-D3)

The procedure described above for VAM-AMPS-NVP terpolymer was followed, except that itaconic acid or a derivative of itaconic acid, dimethyl itaconate (DMI), was used instead of NVP above. The other conditions are the same as above.

VAM-AMPS-VEOVA10 Terpolymer (Samples V1, V2)

The procedure described above for VAM-AMPS-NVP terpolymer was followed, except that vinyl neodecanoate (VEOVA10) was used instead of NVP above and MeOH was also fed in delay feed. The other conditions are the same as above.

VAM-AMPS Copolymer (Samples A1, A2)

The procedure described above for VAM-AMPS-NVP terpolymer was followed, except that no second comonomer was introduced, only AMPS as a comonomer. Further, TRIGONOX EHP was used for an initiator.

VAM-AMPS Copolymer (Sample A3)

VAM was fed to a $1^{st}$ reactor at 15.7 g/min. AMPS aqueous solution (75%) was fed at 0.81 g/min. Initiator (TrigonoxEHP) was fed at 5.73 g/min. In the $1^{st}$ reactor, temperature was maintained at 65° C., with an average residence time of 1.5 hours. After reaction in the 1st reactor, the PVAc solution was discharged and moved to a $2^{nd}$ reactor. In the $2^{nd}$ reactor, the polymer solution was reacted at 65° C. for an additional 1.5 hours. Afterwards, the paste was discharged and methanol vapor was introduced to remove unreacted vinyl acetate, then solids were adjusted to 35 wt %. A sodium hydroxide (NaOH) and methanol solution (4 wt %) was added into the polymer solution so that the mole ratio of NaOH and PVAc was 0.02. The mixture was put in a 40° C. water bath for 2 hours, and subsequently the saponified polyvinyl alcohol was ground and then put in an 80° C. oven for 1.5 hours.

VAM-NVP Copolymer (Sample U4005)

NVP replaced AMPS water solution as described for Samples A1, A2 above. NVP was also fed during the polymerization. TRIGONOX 23 was used for initiator. Other conditions are identical to those of Samples A1 and A2

A VAM Homopolymer (Sample E205) was also produced.

The above described samples and comparative samples were also polymerized and saponified as detailed in Tables 2A and 2B (as provided in FIGS. 5A and 5B).

$C^{13}$NMR Method for Composition 99.9% deuterium oxide was used for $C^{13}$NMR. A 5 wt % sample solution was prepared and put in the NMR tube whose diameter is 5 mm. The measurement condition is as follows:

Temperature: 23° C.

Number of scans: 4096

Delays D[1]: 10 sec

Solution Cast Disintegration Test Method

The solubility of the samples from Tables 1A and 1B were tested using the Solution Cast Disintegration Test Method as follows. 51 g of the PVOH resin Sample was put in 249 mL water, agitating the mixture. The mixture temperature was raised to 93° C. and confirmed the PVOH dissolved completely. After cooling it to room temperature, the aqueous solution was cast onto a glass plate and put in an 80° C. oven for 50 min. This cast attempt was repeated until dried film thickness of 50 μm±3 μm was achieved. The film was conditioned at least over one night at 23° C., 50% humidity. The film was cut into 4.5 cm×3.5 cm pieces without any defects. A 600 mL beaker (PYREX, height 124 mm, inner diameter 85 mm), was filled with 250 mL deionized (DI) water and 250 mL isopropyl alcohol. The solution temperature was adjusted between 22.3 and 23.0° C. The solution was stirred with stir bar (length 50 mm, diameter 9.8 mm) so that the bottom of the vortex reached the 400 mL line of the beaker. The sample film was set in a frame having an opening of 3.5 cm×2.3 cm, and the frame was secured in the beaker with a clamp supported by a platform such that the stirred water would push against the film, causing the film to begin to balloon or wave. The disintegration time was recorded as the time between the moment of insertion of the slide into the stirred/moving water and IPA mixture to the moment of the first observable break in the film. This evaluation was done 3 times for each sample and the average was represented in the results. The results of the test are shown in Tables 3A and 3B below.

% Gel Test Method

The film for this % gel test was prepared by the same method as the film for Solution Cast Disintegration Test Method. Two sheets of film were cut into 4.5 cm×3.5 cm without any defects and weighed (X1, X2 g). One of the samples was put in the oven at 150° C. for 1 hour and weighed (Z1 g) to calculate solids. A 100 ml beaker was prepared and filled with 40 mL water and 40 mL IPA. The solution temperature was adjusted between 22.3 and 23.0° C. The solution was stirred with stir bar (length 25 mm, diameter 7.5 mm) so that the bottom of the vortex reached the 60 mL line of the beaker. Time measurement was started once the sample entered the solution mixture. After 10 min the mixture was filtrated using a 200 mesh filter which was weighed (Y g). Insolubles and mesh were put in the oven at 150 C for 1 h. After drying, the filter and gels were measured (Z2 g). The % gel was calculated as follows with the results presented in Tables 3A and 3B below.

$$\text{Solids } A=Z1/X1\%$$

$$\%\ gel=(Z2-Y)/(A*X)*100$$

TABLE 3A

| Sample # | % gel in 50% $H_2O$/50% IPA | Disintegration Time (seconds) in 50% $H_2O$/50% IPA |
|---|---|---|
| N1 | 0 | 37 |
| N2 | 0 | 32 |
| N3 | 0 | 42 |
| N4 | 0 | 47 |
| N5 | 0 | 52 |
| N6 | 0 | 37 |
| N7 | 0 | 28 |
| N8 | 0 | 33 |
| N9 | 0 | 39 |
| N10 | 0 | 38 |
| N11 | 0 | 37 |
| N12 | 0 | 41 |
| N13 | 0 | 29 |
| N14 | 0 | 30 |
| M1 | 0 | 45 |
| D1 | 0 | 52 |
| I1 | 0 | 30 |
| V1 | 0.6 | 44 |

TABLE 3B

| Sample # | % gel in 50% H2O/50% IPA | Disintegration Time (seconds) in 50% H2O/50% IPA |
|---|---|---|
| N15 | 0 | 57 |
| N16 | 0 | 57 |
| N17 | 0 | 85 |
| D2 | 49 | 52 |
| D3 | 58 | 48 |
| I2 | 7.8-31 | 49 |
| I3 | 36-41 | 52 |
| V2 | 3.3 | 90 |
| A1 | 0 | 59 |
| A2 | 0 | 60 |
| A3 | 0 | 54 |
| U4005 | 79 | 152 |
| E205 | 1 | 76 |

Figure 3:
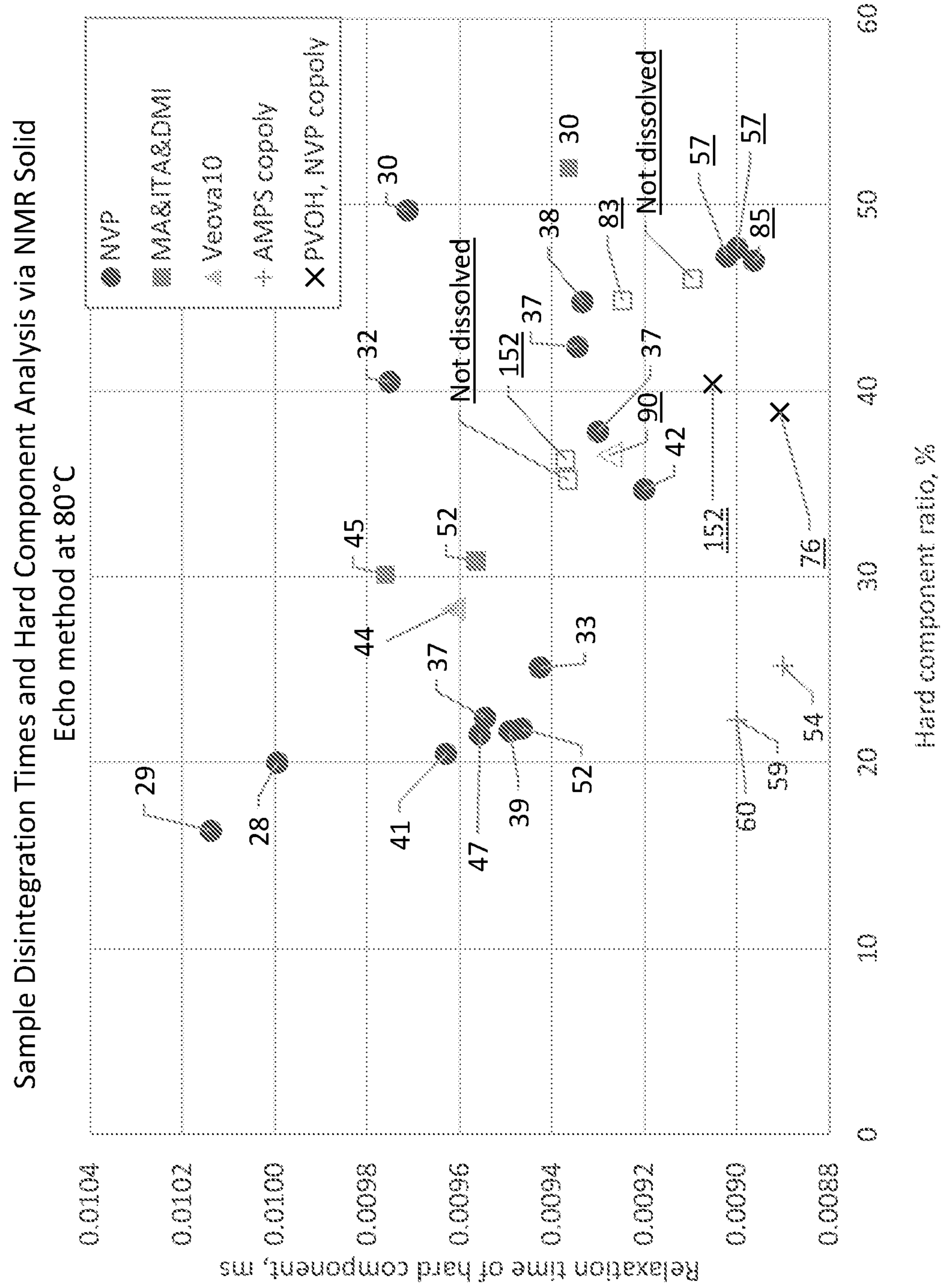
FIGS. 3-4 are graphs of sample disintegration times and component analyses via Pulse NMR for samples of PVOH resins according to one or more embodiments of the present disclosure.
Figure 4:
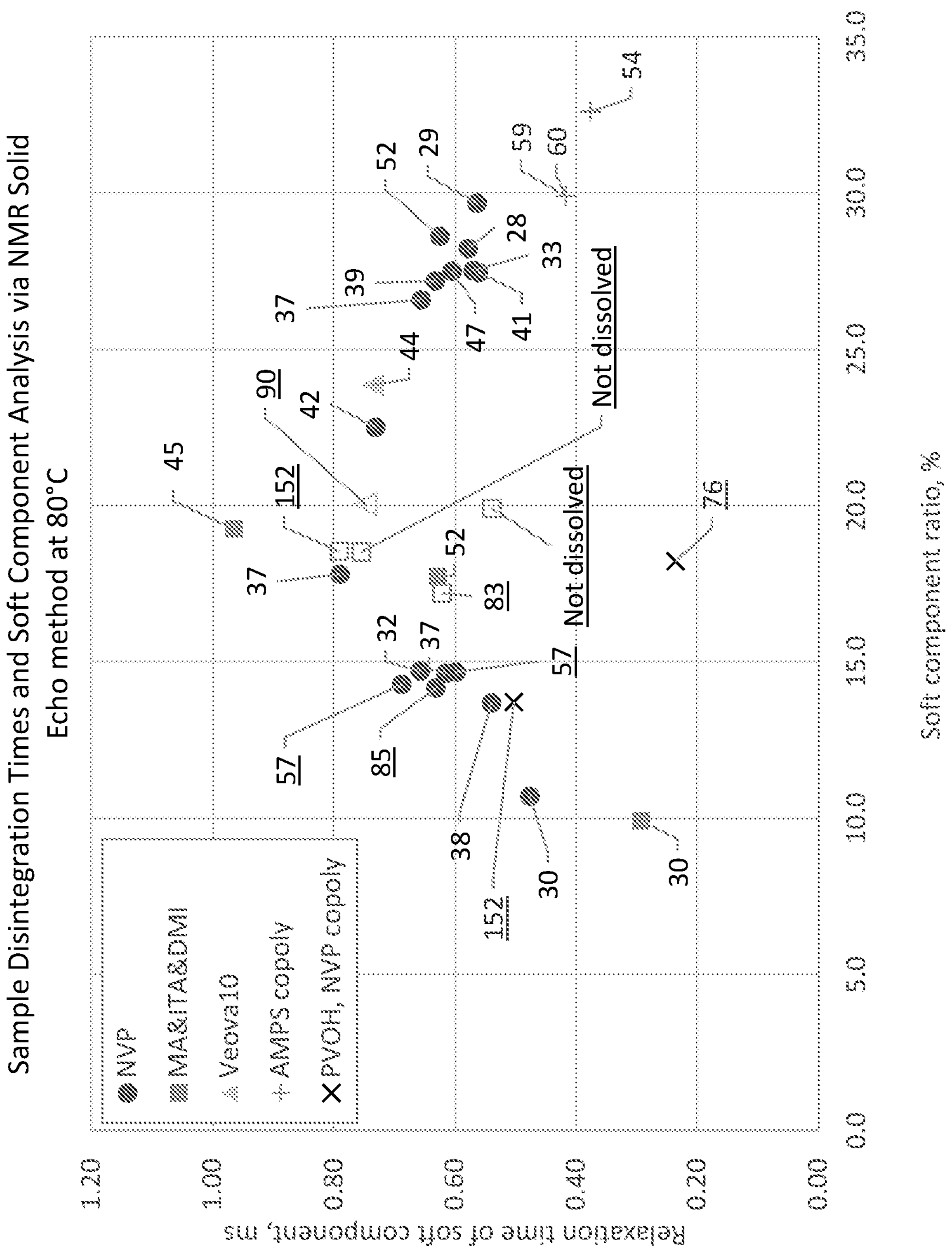

In FIG. 3, in addition to the legend shown, hollowed points refer to samples where the gel % was more than 3.3% for that sample. Numbers extending from each point refer to the measured disintegration time (in seconds) for each sample, and numbers that are underlined refer to samples that had a comparable or longer disintegration time than the co-AMPS copolymer comparative examples. As can be seen from the results of Tables 3A and 3B and FIG. 3, Samples N1, N2, N6, N7, N8, N11, N13 and N14 had fast disintegration times in the 50% water and 50% IPA mixture, such as only 37 seconds for Samples N1, N6, and N11, much faster than any of the comparative VAM-AMPS copolymer (PVOH-co-AMPS) Samples A1-A3. Sample N3, N4, N5, N9, N10 and N12 also had improved performance. Samples N15 and N16 had comparable performance vs. comparative Samples A1-A3. Accordingly, the sulfonic acid modified PVOH with the N-vinyl pyrrolidone (NVP) comonomer resulted in improved performance, but not when the AMPS monomer was present at less than 4 mol %, as shown by the reduced performance of Samples N15, N16 and N17. It was surprisingly discovered that even marginal amounts of the second comonomer, such as low as 0.35 mol %, were able to result in large solubility improvements. It was also surprising to discover that the second comonomer, when present in a lower range, such as between about 0.1 to about 2 mol %, resulted in optimal performance, more preferably between about 0.3 to about 0.8 mol % in the case of NVP. In FIG. 4. in addition to the legend shown, hollowed points refer to samples where the gel % was more than 3.3% for that sample. Numbers extending from each point refer to the measured disintegration time (in seconds) for each sample, and numbers that are underlined refer to samples that had a comparable or longer disintegration time than the co-AMPS copolymer comparative examples. As can be seen from the results of Tables 3A, 3B and FIG. 4, soft component present in a component ratio of 10% or greater and 35% or less, and having a relaxation time of 0.4180 milliseconds or more and 1.2000 milliseconds or less, was related to a higher molecular mobility area of the polymers, such as shown by L in FIG. 1, and meant a relatively large proportion of such area. We hypothesize that a dominant factor influencing the disintegration time is less of the hard component ratio and a higher relaxation time. Further, a higher soft component ratio and higher relaxation time when the hard component ratio is present in a low amount and hard component relaxation time is long, should lead to a short disintegration time. This is because the hard component typically has a stronger influence on disintegration time than the soft component. Therefore, almost all of the data which is inside of the optimal range for the hard components having improved disintegration time are also found inside of the optimal range for soft components.

Further, the terpolymers of the sulfonic acid modified PVOH with methyl acrylate (M1), Dimethyl itaconate (D1), Itaconic acid (I1), or vinyl neodecanoate (V1) also performed better than the VAM-AMPS copolymer samples A1-A3.

Additional secondary structure of the well-performing Sample resins leading to the improved disintegration times are discussed below.

Pulse NMR Characterization

As described above, FIG. 1 is a schematic diagram of the internal structure of an example modified PVOH resin according to one or more embodiments of the present disclosure. As shown in FIG. 1, the resin's internal structure comprises three components, i.e., a first component L, a second component M and a third component S.

The component S is a component having a short relaxation time in a pulsed NMR measurement and refers to a "hard" component with low molecular mobility. In contrast, the component L is a component having a long relaxation time in a pulsed NMR measurement and refers to a "soft" component with high molecular mobility. The component M has a relaxation time in between those of the component S and the component L in a pulsed NMR measurement, and therefore has a molecular mobility between those of the component S and the component L.

In other words, the component S substantially corresponds to the crystalline regions and crosslinked portions of the resin, while the component L corresponds to the amorphous regions of the resin, and the component M to the "interface" regions of the resin between the crystalline and amorphous regions of the resin.

As also described above, FIG. 2 is a conceptual diagram illustrating the three-component analysis of the internal structure of a resin by pulsed NMR measurement. The pulsed NMR measurement of the resin gives a free induction decay curve of 41 spin-spin relaxation. The obtained free induction decay curve can be waveform-separated into three curves stemming from the respective three components, i.e., the hard component S, the middle component M, and the soft component L in ascending order of relaxation time. That is, the actually measured free induction decay curve may also be obtained by superimposing all three free induction decay curves derived from the above-mentioned components S, M and L.

A method of separating and analyzing the three components via pulsed NMR methodology is known, and examples of the literature include DIC Technical Review No. 12/2006, "Phase separation structure analysis of polyurethane resin by solid-state NMR (high-resolution NMR and pulsed NMR)", or document JP 2018-2983 A.

Details of an exemplary pulsed NMR measurement of a resin are provided below.

After conditioning at 25° C., 50% humidity for 48 hours, each powdered PVOH resin sample of about 600 mg was introduced into a sample tube made of glass having a diameter of 10 mm (manufactured by BRUKER, item No. 1824511, diameter: 10 mm, length: 180 mm, flat bottom), such that the height was controlled to 15 mm. The sample was cured a second time at 60° C., 50% humidity for 30 min and installed in a 20 MHz pulsed NMR apparatus ("the Minispec MQ20" manufactured by BRUKER), and then retained at the target temperature of 80° C. The measurement conditions were:

Solid Echo method: Scans: 128 times; Recycle delay: 0.5; Acquisition scale: 1 msec; Temperature: 80° C. This condition is an example. Preferably the number of scans should be set so that the intensity of normalized relaxation curve is 0.02 msec or less, and the recycle delay is 5 times larger than the vertical relaxation time T1.

The resulting free induction decay curve of $^1$H spin-spin relaxation was subjected to waveform separation into three curves derived from the above-mentioned three components S, M and L. The waveform separation was performed by fitting to both a Gaussian model and an exponential model. From the curves derived from the three components obtained in each measurement, the ratio of each component was obtained.

Using analytical software "TD-NMRA (Version 4.3, Rev. 0.8)" of BRUKER, the component S was fitted to a Gaussian model and the component M and the component L were fitted to an exponential model according to the product manual for TD-NMRA (Version 4.3, Rev. 0.8). Also, in the analysis, fitting was performed using points up to 0.6 milliseconds in the relaxation curve with respect to the Solid Echo method.

The following equation was used in the fitting:

$$Y = s \times e^{\left(-\frac{1}{w1} \times \left(\frac{t}{T2S}\right)^{w1}\right)} + m \times e^{\left(-\frac{1}{w2} \times \left(\frac{t}{T2M}\right)^{w2}\right)} + l \times e^{\left(-\frac{1}{w3} \times \left(\frac{t}{T2L}\right)^{w3}\right)}$$

where w1 to w3 are Weibull coefficients; w1 is 2; w2 and w3 are 1; s, m and 1 are the component ratios of the component S, the component M and the component L, respectively; $T_{2S}$, $T_{2M}$ and $T_{2L}$ represent the relaxation times of the component S, the component M and the component L, respectively; and t represents time. As described above, the component S, the component M and the component L are components defined in order of increasing relaxation time in pulsed NMR measurement.

The results of measuring selected Samples of TABLES 1A and 1B above are shown with respect to TABLES 4A and 4B below, as also represented in the graphs of FIGS. 3 and 4.

TABLE 4A

| Sample | Solid, 80 C | | | | | |
|---|---|---|---|---|---|---|
| | Component ratio, % | | | Relaxation time, msec | | |
| # | Hard | Middle | Soft | Hard | Middle | Soft |
| N1 | 22.4 | 51.0 | 26.6 | 0.0095 | 0.0480 | 0.6560 |
| N2 | 40.5 | 44.8 | 14.7 | 0.0098 | 0.0263 | 0.6573 |
| N3 | 34.7 | 42.8 | 22.5 | 0.0092 | 0.0439 | 0.7309 |
| N4 | 21.5 | 51.0 | 27.5 | 0.0096 | 0.0486 | 0.6047 |
| N5 | 21.8 | 49.6 | 28.6 | 0.0095 | 0.0496 | 0.6248 |
| N6 | 42.4 | 43.0 | 14.6 | 0.0093 | 0.0281 | 0.6148 |
| N7 | 20.0 | 51.8 | 28.2 | 0.0100 | 0.0444 | 0.5783 |
| N8 | 25.1 | 47.4 | 27.5 | 0.0094 | 0.0448 | 0.5700 |
| N9 | 21.7 | 51.1 | 27.2 | 0.0095 | 0.0481 | 0.6323 |
| N10 | 44.8 | 41.5 | 13.7 | 0.0093 | 0.0253 | 0.5397 |
| N11 | 37.8 | 44.4 | 17.8 | 0.0093 | 0.0337 | 0.7897 |
| N12 | 20.5 | 52.1 | 27.4 | 0.0096 | 0.0461 | 0.5613 |
| N13 | 16.3 | 54.0 | 29.7 | 0.0101 | 0.0468 | 0.5634 |
| N14 | 49.7 | 39.6 | 10.7 | 0.0097 | 0.0212 | 0.4764 |
| M1 | 30.1 | 50.6 | 19.2 | 0.0098 | 0.0347 | 0.9654 |
| D1 | 30.8 | 51.4 | 17.7 | 0.0096 | 0.0386 | 0.6283 |
| I1 | 52.0 | 38.1 | 9.9 | 0.0094 | 0.0233 | 0.2926 |
| V1 | 28.3 | 47.9 | 23.9 | 0.0096 | 0.0482 | 0.7365 |

TABLE 4B

| Sample | Solid, 80 C | | | | | |
|---|---|---|---|---|---|---|
| | Component ratio, % | | | Relaxation time, msec | | |
| # | Hard | Middle | Soft | Hard | Middle | Soft |
| N15 | 47.7 | 38.0 | 14.3 | 0.0090 | 0.0299 | 0.6879 |
| N16 | 47.2 | 38.1 | 14.7 | 0.0090 | 0.0298 | 0.5981 |
| N17 | 47.0 | 38.8 | 14.2 | 0.0090 | 0.0297 | 0.6319 |
| D2 | 36.3 | 45.2 | 18.5 | 0.0094 | 0.037 | 0.7909 |
| D3 | 35.2 | 46.3 | 18.5 | 0.0094 | 0.036 | 0.7547 |
| I2 | 44.9 | 38.0 | 17.2 | 0.0092 | 0.030 | 0.6213 |
| I3 | 46.0 | 34.1 | 19.9 | 0.0091 | 0.034 | 0.5392 |
| V2 | 36.5 | 43.4 | 20.0 | 0.0093 | 0.0445 | 0.7473 |
| A1 | 22.3 | 47.8 | 29.9 | 0.0090 | 0.0480 | 0.4170 |
| A2 | 22.3 | 47.8 | 29.9 | 0.0090 | 0.0480 | 0.4170 |
| A3 | 25.2 | 42.3 | 32.6 | 0.0089 | 0.0450 | 0.3760 |
| U4005 | 40.4 | 45.9 | 13.7 | 0.0091 | 0.0333 | 0.5030 |
| E205 | 38.8 | 42.9 | 18.2 | 0.0089 | 0.0373 | 0.2358 |

As can be appreciated from the data, the samples having improved disintegration times in the water and IPA mixture also comprised a hard component ratio of less than about 55%, and had a relaxation time of at least 0.0091 msec as measured by the pulsed NMR Solid Echo method at 80° C. Alternatively, samples having improved disintegration times had a hard component relaxation time of at least about 0.0092 msec.

Further, it was found that samples having a soft component present in a component ratio of at least about 10%, and having a relaxation time of at least 0.418 msec, also exhibited improved disintegration times in the water and IPA mixtures.

Accordingly, the present disclosure provides a novel modified PVOH resin composition and method that results in the improved solubility of even sulfonic-acid modified PVOH resins in mixtures of water and alcohol, enabling the benefits of PVOH-co-AMPS and similar chemistries to be introduced to new end-use applications, including formulations for ink, paint, paper coatings, emulsions, and films.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A sulfonic acid modified polyvinyl alcohol resin comprising from 0.1 to 15 mol % of a first comonomer comprising sulfonic acid groups:

wherein the modified polyvinyl alcohol resin has:

a hydroxyl unit content measured by NMR of at least 65 mol %;

a gel fraction of 3.2 or less;

a disintegration time of 85 seconds or less, as measured in a mixture of 50 vol % water and 50 vol % isopropyl alcohol according to the Solution Cast Disintegration Test Method at 23° C.; and a hard component present in a component ratio of 10% or greater and 55% or less and having a relaxation time of 0.0091 milliseconds or greater and 0.0104 milliseconds or less, as measured by the pulsed NMR Solid Echo method at 80° C., wherein the modified polyvinyl alcohol resin has a soft component present in a component ratio of 10% or greater and 35% or less and having a relaxation time of 0.4180 milliseconds or more and 1.2000 milliseconds or less, as measured by the pulsed NMR Solid Echo method at 80° C.

2. The sulfonic acid modified polyvinyl alcohol resin as claimed in claim 1, wherein the modified polyvinyl alcohol resin has a hard component present in a component ratio of 15% or greater and 50% or less and having a relaxation time of 0.0091 milliseconds or greater and 0.0102 milliseconds or less, as measured by the pulsed NMR Solid Echo method at 80° C.

3. The sulfonic acid modified polyvinyl alcohol resin as claimed in claim 1, wherein the soft component has a relaxation time of 0.47 milliseconds or more and 0.97 milliseconds or less, as measured by the pulsed NMR Solid Echo method at 80° C.

4. The sulfonic acid modified polyvinyl alcohol resin as claimed in claim 1, wherein the modified polyvinyl alcohol resin has a disintegration time of 24 to 54 seconds, as measured in a mixture of 50 vol % water and 50 vol % isopropyl alcohol according to the Solution Cast Disintegration Test Method at 23° C.

5. The sulfonic acid modified polyvinyl alcohol resin as claimed in claim 1, wherein the first comonomer comprising sulfonic acid groups comprises 2-acrylamido-2- methylpropanesulfonic acid.

6. The sulfonic acid modified polyvinyl alcohol resin as claimed in claim 1, wherein the modified polyvinyl alcohol resin is a terpolymer.

7. The sulfonic acid modified polyvinyl alcohol resin as claimed in claim 6, wherein the terpolymer comprises from 0.1 to 15 mol % of a second comonomer selected from the group consisting of a pyrrolidone, a carboxylate, and an alkyl ester, wherein the alkyl ester is a vinyl ester having a tertiary substituted carbon branched with a total of 6 to 20 carbon atoms.

8. The sulfonic acid modified polyvinyl alcohol resin as claimed in claim 7, wherein the second comonomer comprises N-vinyl pyrrolidone, methyl acrylate, itaconic acid or a derivative of itaconic acid, or vinyl neodecanoate.

9. The sulfonic acid modified polyvinyl alcohol resin as claimed in claim 7, comprising from 4 mol % to 8 mol % of the first comonomer and from 0.25 to 3 mol % of the pyrrolidone comonomer.

10. The sulfonic acid modified polyvinyl alcohol resin as claimed in claim 7, comprising from 3 mol % to 8 mol % of the first comonomer and from 0.1 to 6 mol % of the carboxylate comonomer.

11. The sulfonic acid modified polyvinyl alcohol resin as claimed in claim 7, comprising from 2 mol % to 8 mol % of the first comonomer and from 2 to 6 mol % of the alkyl ester comonomer.

12. The sulfonic acid modified polyvinyl alcohol resin as claimed in claim 1, wherein the modified polyvinyl alcohol resin has a gel fraction of 0.6 or less.

13. A method of producing a sulfonic acid modified polyvinyl alcohol resin, comprising copolymerizing a vinyl ester monomer with a sulfonic acid comonomer and incorporating a second comonomer to produce the sulfonic acid modified polyvinyl alcohol resin as claimed in claim 1.

14. An ink, paint, paper coating, emulsion, or film comprising the sulfonic acid modified polyvinyl alcohol resin as claimed in claim 1.

15. A sulfonic acid modified polyvinyl alcohol resin comprising from 4 to 8 mol % of a first comonomer comprising sulfonic acid groups:

wherein the modified polyvinyl alcohol resin has:

a hydroxyl unit content measured by NMR of at least 65 mol %;

a gel fraction of 3.2 or less;

a disintegration time of 85 seconds or less, as measured in a mixture of 50 vol % water and 50 vol % isopropyl alcohol according to the Solution Cast Disintegration Test Method at 23° C.; and a hard component present in a component ratio of 10% or greater and 55% or less and having a relaxation time of 0.0091 milliseconds or greater and 0.0104 milliseconds or less, as measured by the pulsed NMR Solid Echo method at 80° C., wherein the modified polyvinyl alcohol resin is a terpolymer, wherein the terpolymer comprises from 0.25 to 3 mol % of a pyrrolidone comonomer.

16. The sulfonic acid modified polyvinyl alcohol resin as claimed in claim 15, wherein the first comonomer comprising sulfonic acid groups comprises 2-acrylamido-2-methylpropanesulfonic acid.

17. An ink, paint, paper coating, emulsion, or film comprising the sulfonic acid modified polyvinyl alcohol resin as claimed in claim 15.

18. A sulfonic acid modified polyvinyl alcohol resin comprising from 3 to 8 mol % of a first comonomer comprising sulfonic acid groups:

wherein the modified polyvinyl alcohol resin has:

a hydroxyl unit content measured by NMR of at least 65 mol %;

a gel fraction of 3.2 or less;

a disintegration time of 85 seconds or less, as measured in a mixture of 50 vol % water and 50 vol % isopropyl alcohol according to the Solution Cast Disintegration Test Method at 23° C.; and a hard component present in a component ratio of 10% or greater and 55% or less and having a relaxation time of 0.0091 milliseconds or greater and 0.0104 milliseconds or less, as measured by the pulsed NMR Solid Echo method at 80° C., wherein the modified polyvinyl alcohol resin is a terpolymer, wherein the terpolymer comprises from 0.1 to 6 mol % of a carboxylate comonomer.

19. The sulfonic acid modified polyvinyl alcohol resin as claimed in claim 18, wherein the first comonomer comprising sulfonic acid groups comprises 2-acrylamido-2-methylpropanesulfonic acid.

20. An ink, paint, paper coating, emulsion, or film comprising the sulfonic acid modified polyvinyl alcohol resin as claimed in claim 18.

* * * * *